(12) United States Patent　(10) Patent No.: US 6,827,445 B2
Abe et al.　(45) Date of Patent: Dec. 7, 2004

(54) SUN-TRACKING DAYLIGHTING APPARATUS

(75) Inventors: Hiroshi Abe, Hirakata (JP); Atsushi Ogawa, Kyoto (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 10/470,261

(22) PCT Filed: Feb. 6, 2002

(86) PCT No.: PCT/JP02/00998

§ 371 (c)(1),
(2), (4) Date: Aug. 4, 2003

(87) PCT Pub. No.: WO02/063209

PCT Pub. Date: Aug. 15, 2002

(65) Prior Publication Data

US 2004/0050380 A1 Mar. 18, 2004

(30) Foreign Application Priority Data

Feb. 7, 2001 (JP) ........................ 2001-030666

(51) Int. Cl.[7] ................................. F24J 2/00
(52) U.S. Cl. ..................... 353/3; 126/574; 126/575
(58) Field of Search ............................ 353/3; 126/574, 126/575, 600, 601, 602; 359/591, 597

(56) References Cited

U.S. PATENT DOCUMENTS 4,320,288 A * 3/1982 Schlarlack ............... 250/203.4
4,368,962 A * 1/1983 Hultberg ........................ 353/3
4,424,802 A * 1/1984 Winders ...................... 126/575
4,440,150 A * 4/1984 Kaehler ....................... 126/602
6,493,145 B1 * 12/2002 Aoki et al. .................. 359/597

FOREIGN PATENT DOCUMENTS

| FR | 2 678 752 | 1/1993 |
| JP | 5-205507 | 8/1993 |
| JP | 2000-48611 | 2/2000 |
| JP | 2001-210115 | 8/2001 |

* cited by examiner

Primary Examiner—William C. Dowling
(74) Attorney, Agent, or Firm—Armstrong, Kratz, Quintos, Hanson & Brooks, LLP (57) ABSTRACT

A solar lighting apparatus of the sun tracking type for guiding sunlight into a building by using light reflecting means (30), the apparatus comprising the light reflecting means (30) for reflecting sunlight, drive means (60) for driving the light reflecting means, control means (70) for controlling the drive means to orient the light reflecting means toward the direction of the sun, and power source means (20) for supplying electric power to the drive means and the control means. The power source means (20) comprises a main power source unit (22) chargeable by a solar cell panel (40) for supplying electric power to the drive means (60) and the control means (70), and a backup secondary cell (24) chargeable with the electric power from the main power source unit for supplying electric power to the control means (70). The control means (70) comprises real time clock means (75) for measuring time, and a CPU (76) for calculating the direction of the sun based on data as to time measured by the clock means and controlling the operation of the drive means. The CPU (76) is switchable from a sleep mode to an active mode in operating state based on the time data from the clock means (75).

5 Claims, 6 Drawing Sheets

SUN-TRACKING DAYLIGHTING APPARATUS

FIELD OF THE INVENTION

The present invention relates to solar lighting apparatus of the sun tracking type, and more particularly to a solar lighting apparatus of the type mentioned which has a power source chargeable by a solar cell.

BACKGROUND ART

Solar lighting apparatus are adapted for use with a skylight bore having an opening in the roof of a building and extending to the ceiling for admitting sunlight into the interior of the building where sunlight is not available. The apparatus has light reflecting means, which is provided at the upper end of the skylight bore for reflecting sunlight into the interior through the bore.

Solar lighting apparatus of the sun tracking type are known which comprise light reflecting means directed toward the sun and made rotatable to track the sun so as to achieve an improved light admission efficiency since the sun changes in position with time.

With the solar lighting apparatus of the sun tracking type, the light reflecting means is rotated by a motor as a drive source. The motor is so controlled that the reflecting means is thereby rotated to track the sun during the daylight hours from sunrise till sunset and is further directed after sunset toward the position of sunrise on the next day.

When used as a power source for the motor, the commercial power source requires wiring from an interior receptacle, hence a need for labor and time. Power sources of the solar cell type are therefore suitable to use. With the power source of this type, a capacitor is charged with electric power output from a solar cell and delivers an output voltage to a constant-voltage circuit, which supplies a constant voltage to a motor drive source or the like.

When the power source of the solar cell type is used, it becomes impossible to drive the motor if the power source is completely discharged due to a spell of rainy or cloudy weather which results in an insufficient amount of sunlight. If a capacitor of great output is used to hold the system stabilized, the apparatus becomes costly. Accordingly, the power consumption required for the overall system needs to be as small as possible.

The means for controlling the driving of the apparatus in preparation for an interruption of power supply from the power source is usually provided with a backup secondary cell. The control means has incorporated therein data required for causing the light reflecting means to track the sun, and the data includes information, for example, as to the latitude and longitude of the site of installation of the solar lighting apparatus. If such information is initialized, restoration of the system requires much labor. When a backup secondary cell of increased capacity is used to hold the system stabilized, the apparatus becomes more costly. For this reason, the secondary cell must be checked meticulously for the charged state.

An object of the present invention is to reduce the power consumption of the overall system of a solar lighting apparatus of the sun tracking type wherein a solar cell power source is used.

Another object of the invention is to ensure a specified amount of charge at all times by monitoring the charged state of a backup secondary cell for control means for use in the solar lighting apparatus of the sun tracking type wherein a solar cell power source is used.

DISCLOSURE OF THE INVENTION

To overcome the problems described above, the present invention provides a solar lighting apparatus of the sun tracking type for guiding sunlight into a building by using light reflecting means, the apparatus comprising the light reflecting means for reflecting sunlight, drive means for driving the light reflecting means, control means for controlling the drive means to orient the light reflecting means toward the direction of the sun, and power source means for supplying electric power to the drive means and the control means, the power source means comprising a main power source unit chargeable by a solar cell panel for supplying electric power to the drive means and the control means, and a backup secondary cell chargeable with the electric power from the main power source unit for supplying electric power to the control means, the control means comprising real time clock means for measuring time, and a CPU for calculating the direction of the sun based on data as to time measured by the clock means and controlling the operation of the drive means, and the CPU being switchable from a sleep mode to an active mode in operating state based on the time data from the clock means.

The CPU controls the operation of the drive means in accordance with the time data from the clock means when in the active mode and is thereafter switched to the sleep mode. Stated specifically, the main power source unit is electrically connected to the control means and the drive means by way of a main power source switch, and the CPU turns on the main power source switch to drive the drive means and move the light reflecting means upon finding that the present time is in a time zone for tracking the sun when in the active mode and is thereafter switched from the active mode to the sleep mode in operating state, or is switched from the active mode to the sleep mode in operating state without driving the drive means when finding that the present time is not in the time zone for tracking the sun.

The CPU checks the backup secondary cell for the amount of charge therein in the active mode, and can thereafter be switched to the sleep mode. Stated more specifically, a charging switch is provided between the main power source switch and the backup secondary cell, and the CPU checks the secondary cell for the amount of charge therein in the active mode, turns on the charging switch when detecting a value lower than a predetermined amount of charge and is thereafter switched to the sleep mode.

The secondary cell can be charged in preference to the operation of the drive means.

A memory for storing data as to the latitude and longitude of the location of installation of the solar lighting apparatus can be included in the real time clock means. In this case, the backup secondary cell may back up the real time clock means only.

With the solar lighting apparatus of the sun tracking type of the invention, the CPU is set in the sleep mode and is changed over to the active mode only when interrupted by the real time clock means in a specified cycle. In the active mode, the CPU is returned to the sleep mode when not in the sun tracking time zone, or the CPU controls the operation of the drive means as specified, checks the backup secondary cell for the amount of charge therein when in the sun tracking time zone, and is thereafter set in the sleep mode again. Thus, the control means and the drive means remain out of operation until the CPU is subsequently interrupted by the real time clock means. This reduces the power consumption of the overall system of the apparatus to a minimum essential level.

When an interrupt is made by the clock means in the specified cycle, the backup secondary cell is checked for the amount of charge therein and charged if the detected value is less than a predetermined level. Thus, the predetermined amount of charge can be retained in the cell at all times.

BEST MODE OF CARRYING OUT THE INVENTION

The preferred embodiment of the invention will be described below in detail with reference to the drawings.

FIGS. 4 to 8 show the construction of embodiment of solar lighting apparatus of the sun tracking type wherein a solar cell power source is used.

Although the illustrated solar lighting apparatus has light reflecting means as supported in suspension, the light reflecting means is not limited to the suspended type, but the invention is of course applicable to solar lighting apparatus having light reflecting means which is installed as supported at its lower portion.

Figure 5:
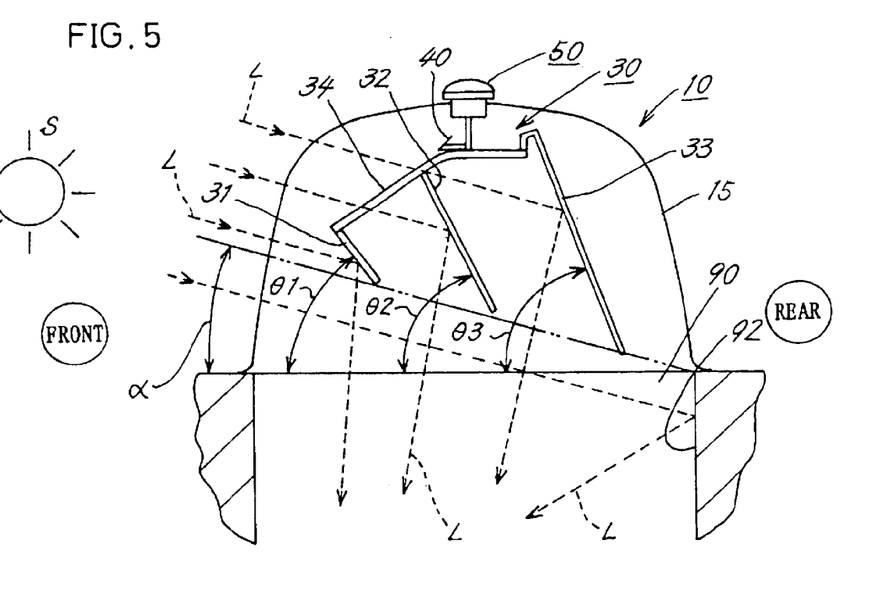
FIG. 5 is a view in section taken along the line V—V in FIG. 4.
Figure 6:
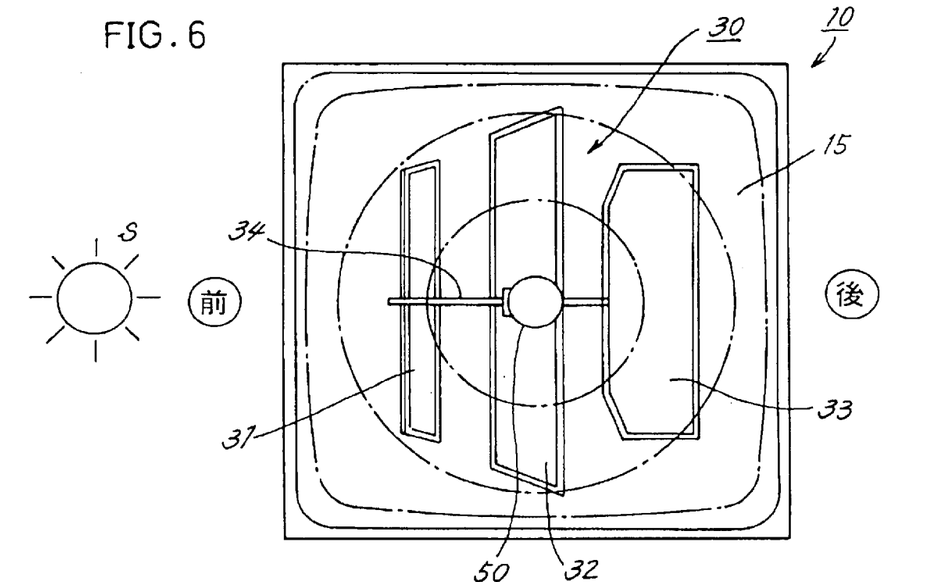
FIG. 6 is a plan view of the embodiment of solar lighting apparatus of the sun tracking type.

For convenience of explanation, the direction toward the sun S will be referred to as "front," and the opposite side as "rear" as shown in FIGS. 5 and 6.

The solar lighting apparatus 10 of the sun tracking type is installed at the upper end of a skylight bore 90 extending from the roof of a building through the ceiling thereof as seen in FIG. 5.

The skylight bore 90 has at its upper end an opening formed in a roof portion of the building. The bore 90 is generally in the form of a square measuring about 120 cm in the length of one side, and is oriented in a direction which changes with the size, structure of the building or room, direction the building or room faces, required amount of light and like conditions.

An inner wall 92 defining the skylight bore 90 has a mirror surface so as to guide the rays of light L reflected by the apparatus 10 efficiently into an interior space. Provided at the lower end (at the interior ceiling side) of the bore 10 is a transparent interior diffusion plate (not shown) for diffusing the light admitted into the interior space.

Figure 4:
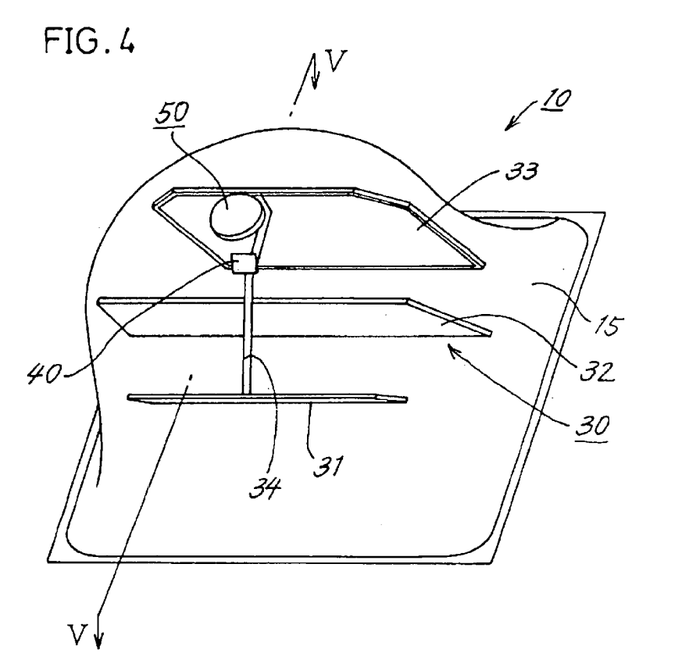
FIG. 4 is a perspective view of an embodiment of solar lighting apparatus of the sun tracking type.

With reference to FIGS. 4 to 6, the sun tracking solar lighting apparatus 10 comprises a dome 15 mounted over the upper end of the skylight bore 90, light reflecting means 30 disposed within the dome and supported in suspension by the dome, and a control box 50 for rotating the reflecting means 30 to cause the means to track the sun.

The dome 15 is a transparent or translucent cover for protecting the light reflecting means 30 from wind, rain, dust, etc. and preventing these from ingressing into the interior. The illustrated dome 15 is prepared from acrylic resin and has a generally semispherical central portion and a peripheral edge portion which is square in conformity with the shape of the skylight bore 90. The dome 15 is not limited to the semispherical shape but can be in any of various shapes such as square or rectangular shape and conical or pyramidal shape.

Formed in the top of the dome 15 centrally thereof is a mount hole (12) for attaching the control box 50 to the dome. The dome has screw bores equidistantly spaced apart around the mount hole for use in fastening the control box 50 with screws.

The light reflecting means 30 comprises a plurality of reflective panels 31, 32, 33 attached to a support frame 34 and is disposed inside the dome 15 and supported thereby in suspension.

Figure 7:
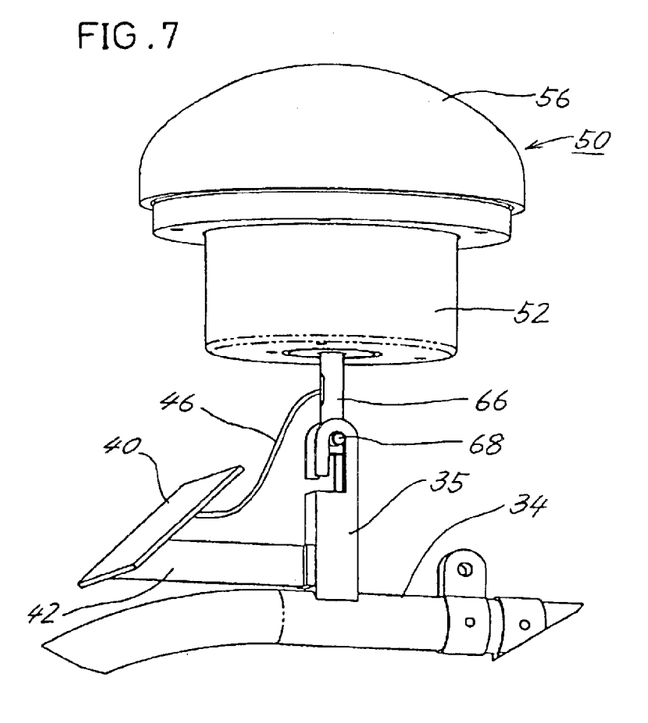
FIG. 7 is a perspective view of a portion including a support frame through a control box.

The support frame 34 is in the form of a bar inclined downward toward the front (toward the sun S) and has a suspending hook 35 projecting upward from a portion thereof slightly rearward from its midportion (see FIG. 7). The support frame 34 is provided with the three reflective panels 31, 32, 33.

Each of the reflective panels 31, 32, 33 is a mirror for reflecting sunlight and is prepared, for example, by affixing to a lightweight styrene resin plate a resin film having a mirror surface formed by vacuum evaporation of aluminum. The reflective panels 31, 32, 33 are arranged as supported by the front end, middle portion and rear end of the support frame 34, with their panel surfaces opposed to one other.

In order to achieve a high efficiency of light admitting even when the sun is at a low altitude, it is desired that the reflective panels 31, 32, 33 be made in different sizes and attached at different angles.

Stated more specifically, the front reflective panel 31 is preferably smaller than the other panels in both height and width, while the middle reflective panel 32 is preferably greater than the rear panel 33 in width although smaller than this panel 33 in height. Further preferably, the reflective panels 31, 32, 33 as arranged from the rear forward have their lower ends positioned at progressively higher levels.

The panels 31, 32, 33 have respective angles of inclination θ1, θ2 and θ3 which decrease from panel to panel toward the front. Thus it is desired that the panels be attached so as to incline forward (θ1<θ2<θ3). For example, these angles θ1, θ2, θ3 as shown in this order from the front rearward can be 55°, 65°, 70°, respectively. This achieves an optimum light admitting efficiency in accordance with the altitude of the sun.

Figure 8:
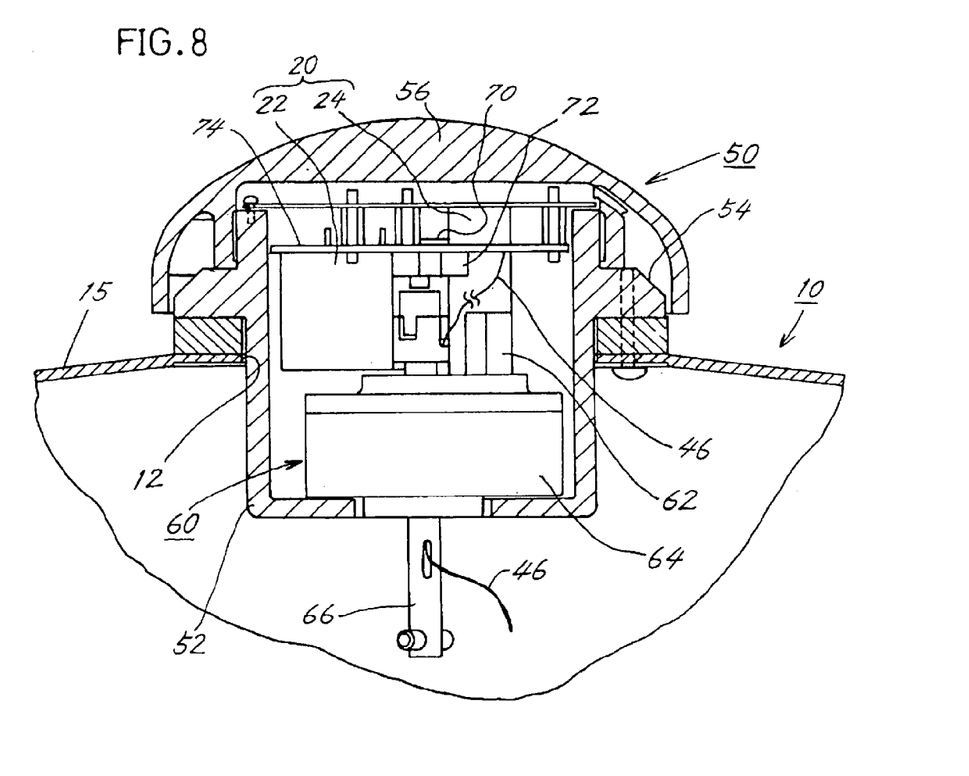
FIG. 8 is a view in section of the control box as attached to a dome.

With reference to FIGS. 7 and 8, a solar cell support frame 42 extends forward from a hook 35 of the support frame 34, and the solar cell panel 40 facing obliquely upward is attached to the front end of the frame 42.

The solar cell panel 40 is attached to the support frame 42 of the light reflecting means 30 so as to be rotatable with the frame 34 and is therefore adapted to track the sun with the reflecting means 30 and to generate electricity with a high efficiency during the daylight hours.

The solar cell panel 40 has connected thereto wiring 46 and is electrically connected to power source means 20 by the wiring 46.

The control box 50 is fitted in the mount hole 12 in the top of the dome 20, supporting the support frame 34 of the light reflecting means 30 in suspension.

The control box 50 has a casing 52 having housed therein drive means 60, control means 70, the power source means 20, etc.

The casing comprises a casing body 52 in the form of a cylinder having a bottom, and a closure 56 as seen in FIG. 8. The closure 56 has an outer edge extending outward as if covering a flange 54 of the casing body 52, closing an upper opening of the casing body 52.

A gear box 64 providing the drive means 60 is disposed inside the casing body 52.

A motor 62 is coupled to the rotating shaft 66 by a reduction gear mechanism (not shown) in the gear box 64.

The control means 70 comprises various electronic components mounted on a circuit board 74 and required for controlling the drive means 60, etc. Angle detecting means 72 is provided on the lower surface of the circuit board 74 centrally thereof.

The angle detecting means 72 serves to detect the angle of the light reflecting means 30 and is connected to the rotating shaft 66 by a coupling. Usable as the angle detecting means 72 is a potentiometer have a resistance value variable with the value of the angle of rotation.

The board 74 is provided with the power source means 20, which comprises a main power source unit 22 and a secondary cell 24. Usable as the main power source unit 22 is a capacitor of great capacity (supercapacitor). Usable as the secondary cell 24 is a manganese dioxide-lithium secondary cell.

Figure 1:
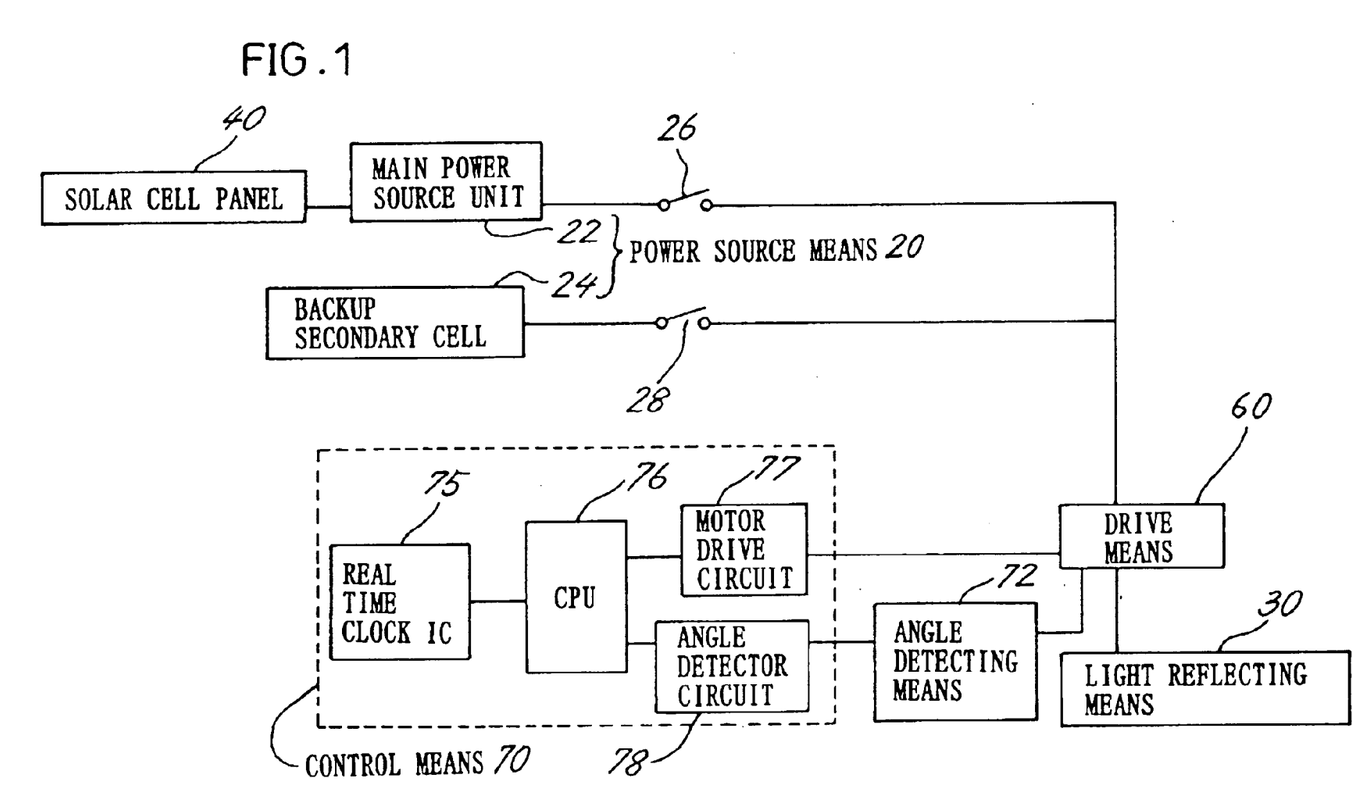
FIG. 1 is a block diagram showing an electric system of a solar lighting apparatus of the sun tracking type of the invention.

Next, a description will be given of the electric system of the solar lighting apparatus of the invention with reference to the block diagram of FIG. 1.

The electric power generated by the solar cell panel 40 during daylight hours is supplied to the main power source unit 22 and stores in the capacitor of the unit. Generally the unit 22 includes a constant voltage circuit for supplying a constant voltage to the load, in addition to the capacitor.

The main power source unit 22 is electrically connected via a main power source switch 26 to the drive means 60 for rotating the light reflecting means 30 and to the control means 70 for controlling the drive means, etc. and supplies power to the drive means 60 and the control means 70.

The present apparatus has another power source means, i.e., a backup secondary cell 24 for supplying power to the control means 70. A charging switch 28 is provided between the main power switch 26 and the cell 24.

The drive means 60 is connected to the angle detecting means 72 and the light reflecting means 30.

The control means 70 has a real time clock IC 75 serving as real time clock means, CPU 76, motor drive circuit 77 and angle detector circuit 78.

The real time clock IC 75 prepares time data and interrupts the CPU in a specified cycle. A memory having stored therein data as to the latitude and longitude of the location of installation of the solar lighting apparatus can be included in the clock IC.

The CPU 76 receives the time data from the real time clock IC 75, calculates the direction of the sun based on the data as to the time measured by the IC 75 and controls the operation of the drive means 60. The CPU further checks the backup secondary cell for the amount of charge therein and monitors the system to check abnormalities or the like.

The motor drive circuit 77 is connected to the CPU 76 and drives the motor 62 under the control of the CPU 76 to cause the light reflecting means 30 to move for tracking the sun.

The angle detector circuit 78 is connected to the CPU 76. The result of detection by the angle detecting means 72 is sent to the CPU 76.

Figure 2:
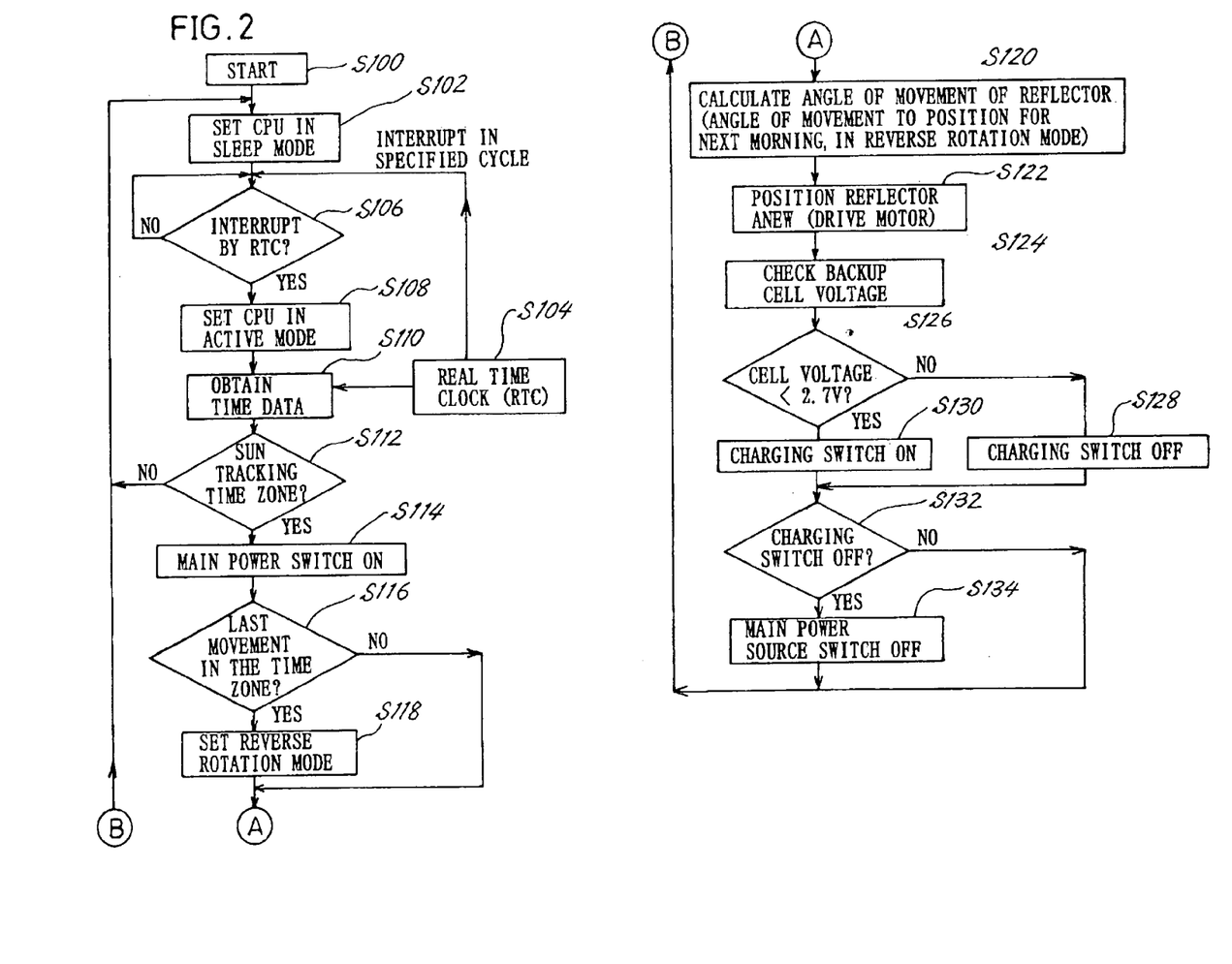
FIG. 2 is a flow chart showing an exemplary control operation to be performed by control means of the solar lighting apparatus of the invention.

Next, the flow of control by the control means of the solar lighting apparatus of the invention will be described next with reference to the flow chart.

Referring to FIG. 2, when use of the solar lighting apparatus is started in step 100, the CPU is set in a sleep mode (step 102). The term "sleep mode" refers to a mode wherein the CPU and the peripheral devices thereof are held out of operation and which includes a state involving no consumption of electric power.

The real time clock make an interrupt to the CPU in a specified cycle (step 104). This cycle is the interval at which the solar cell panel and the light reflecting means track the sun, and the shorter the interval, the higher the efficiencies of power generation and light admission are, but the greater the power consumption is. For the solar lighting apparatus of the present invention to achieve the desired power generation and light admission efficiencies, with the increase of power consumption suppressed, the cycle of interrupting the CPU by the real time clock is set at 10 minutes. However, this cycle can of course be set suitably at an optimum period of time in accordance with the latitude and longitude of the location where the solar lighting apparatus is installed.

When the CPU is found interrupted by the real time clock in step 106, the CPU is set in an active mode. The term "active mode" means a mode wherein the CPU executes a program.

In this active mode, the CPU obtains data as to the present time from the real time clock (step 110).

Next, an inquiry is made as to whether the present time is in a time zone for tracking the sun (step 112). The term "sun tracking time zone" means daylight hours from sunrise to sunset, during which the light reflecting means is moved to track the sun and guide sunlight into the interior. When the inquiry is answered in the negative, step 102 follows again to set the CPU in the sleep mode and avoid useless consumption of power.

When the present time is in the sun tracking time zone, the sequence proceeds to step 114, wherein the main power source switch is turned on. An inquiry is then made as to whether the current movement is the last movement in the sun tracking time zone (step 116).

If the inquiry of step 116 is answered in the negative, step 120 follows, in which the CPU calculates an angle of movement of the light reflecting means. The drive means rotatingly moves the reflecting means only by the angle indicated by the CPU to position the light reflecting means anew (step 122). At this time, the solar cell panel is rotatingly moved at the same time.

When the inquiry of step 116 is answered in the affirmative, a reverse rotation mode is set for the light reflecting means (step 118). When this mode is set, the angle of movement of the light reflecting means is set to the position of sunrise in the following morning in the next step 120. The light reflecting means is reversely rotated and positioned anew (step 122).

The amount of charge in the backup secondary cell is checked in step 124. The voltage is checked as a typical indicator. Next, an inquiry is made as to whether the cell voltage is lower than a predetermined voltage (step 126). The predetermined voltage in the present embodiment is 2.7 V.

If the voltage of the secondary cell is lower than 2.7 V, the charging switch is turned on (step 130) to charge the backup secondary cell with the power delivered from the main power source unit. When the next step 132 finds that the charging switch is not off, the sequence returns to step 102, with the main power source switch held on, to set the CPU in the sleep mode.

When the voltage of the secondary cell is found to be at least 2.7 V in step 126, the charging switch is turned off since there is no need for charging (step 128). When the charging switch is found off in step 132, the main power source switch is turned off in the next step 134, followed by step 102 again to set the CPU in the sleep mode.

Figure 3:
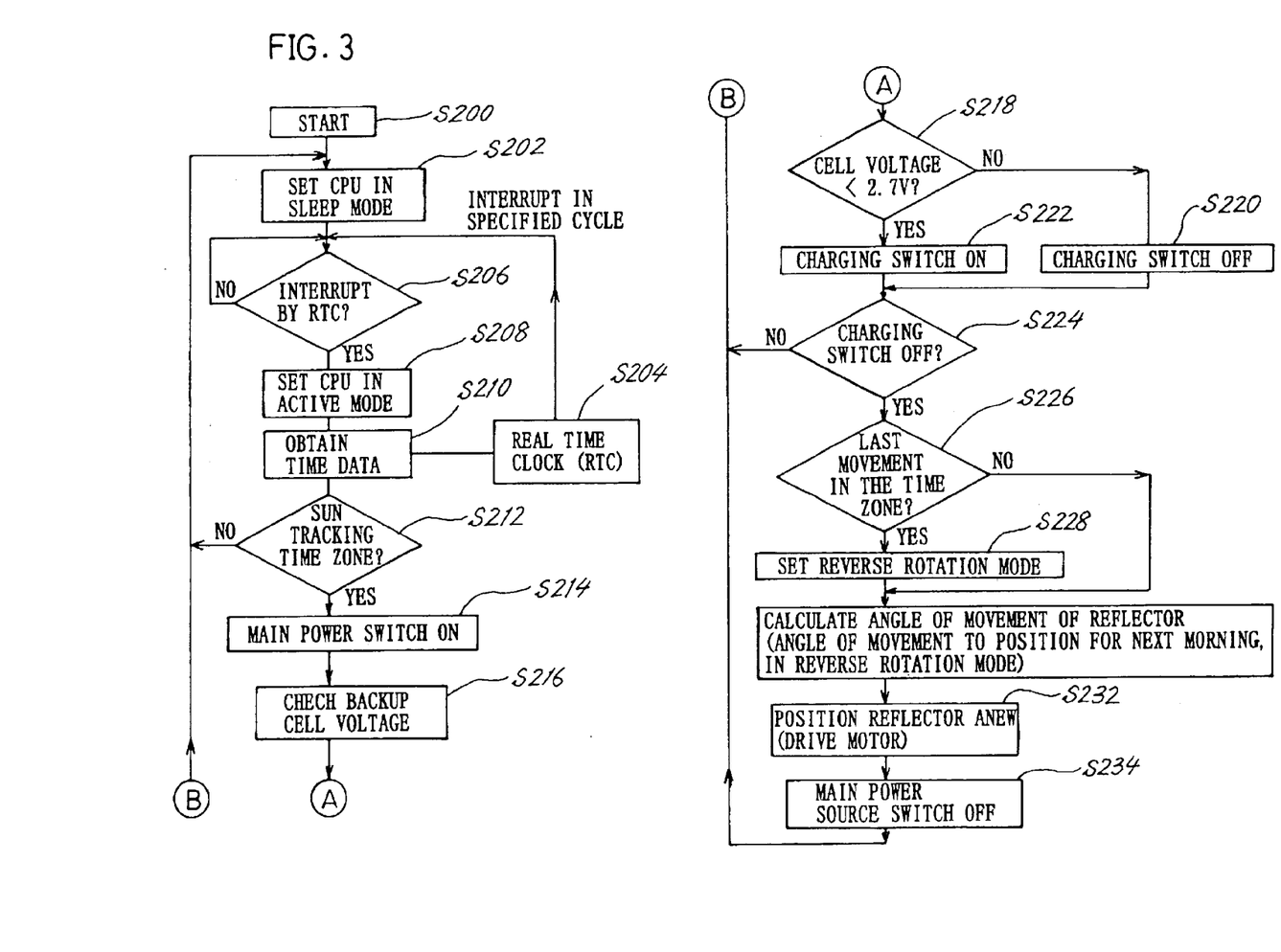
FIG. 3 is a flow chart showing another exemplary control operation to be performed by the control means of the solar lighting apparatus of the invention.

FIG. 3 is a flow chart showing a procedure for checking the secondary cell for the charge therein and charging the secondary cell which procedure is to be performed in preference to the operation of the drive means.

Step 200 of starting the use of the solar lighting apparatus through step 214 of turning on the main power source switch are the same as in FIG. 2 and will therefore not be described again.

When the main power source switch is turned on (step 214), the backup second cell is checked for voltage (step 216). An inquiry is then made in step 218 as to whether the cell voltage is lower than 2.7 V (predetermined voltage). If the voltage is lower than 2.7 V, the charging switch is turned on (step 222), charging the cell with the power delivered from the main power source unit. If the charging switch is found not off in the next step 224, the sequence returns to step 202 to set the CPU in the sleep mode.

When the voltage of the secondary cell is found to be at least 2.7 V in step 218, the charging switch is turned off since there is no need for charging (step 220). If the charging switch is found off in step 224, step 226 follows.

The backup secondary cell serves to back up the electric system of the control means. The cell is checked for the charged state and charged as required in preference to the operation of the drive means, whereby the control means is prevented from being initialized until the main power source unit is charged again even if the unit is completely discharged temporarily.

In the case where a memory having stored therein data as to the latitude and longitude of the location of installation of the solar lighting apparatus is incorporated in the real time clock IC, the backup secondary cell can be so adapted as to back up the clock IC only of the control means. The reason is that if the data as to the latitude and longitude of the location of installation of the solar lighting apparatus is initialized, the restoration of the system requires much labor.

Step 226 of inquiring whether the current movement is the last movement in the sun tracking time zone through step 232 of positioning the light reflecting means anew are the same as step 116 through step 124 of FIG. 2. When the light reflecting means is positioned anew in step 232, the main power source switch is turned off in the next step 234, followed by step 202 again to set the CPU in the sleep mode.

As described in detail with reference to the embodiment of solar lighting apparatus of the invention, the CPU is set in the sleep mode, and only when an interrupt is made by the real time clock in the specified cycle, the CPU is switched to the active mode, in which the operation of the drive means is controlled as specified in accordance with the time data from the real time clock, the backup cell is checked for the charge therein and charging is effected as required, whereupon the sleep mode is resumed. The control means and the drive means therefore remain out of operation until an interrupt is subsequently made by the real time clock. This results in minimized power consumption, stabilizing the system more effectively even if the capacitor of the main power source unit has the same capacity as in the prior art.

The backup secondary cell is checked for the amount of charge therein when an interrupt is made by the real time clock in the specified cycle, charged if the charge is less than the predetermined level and accordingly thus adapted to retain the predetermined amount of charge. The system is therefore exceedingly superior to the conventional one with respect to stability even if the secondary cell has the same capacity as conventionally.

In the case where the secondary cell is-used exclusively for backing up the real time clock means, the cell can be further smaller in capacity.

INDUSTRIAL APPLICABILITY

The solar lighting apparatus of the sun tracking type is reduced in the power consumption of the overall system of the apparatus, permits the secondary cell for backing up the control means of the apparatus to retain the required amount of charge at all times, and is therefore very useful.

What is claimed is:

1. A solar lighting apparatus of the sun tracking type for guiding sunlight into a building by using light reflecting means, the apparatus comprising the light reflecting means for reflecting sunlight, drive means for driving the light reflecting means, control means for controlling the drive means to orient the light reflecting means toward the direction of the sun, and power source means for supplying electric power to the drive means and the control means, the power source means comprising a main power source unit chargeable by a solar cell panel for supplying electric power to the drive means and the control means, and a backup secondary cell chargeable with the electric power from the main power source unit for supplying electric power to the control means, the control means comprising real time clock means for measuring time, and a CPU for calculating the direction of the sun based on data as to time measured by the clock means and controlling the operation of the drive means, and the CPU being switchable from a sleep mode to an active mode in operating state based on the time data from the clock means.

2. The solar lighting apparatus of the sun tracking type according to claim 1 wherein the CPU controls the operation of the drive means in accordance with the time data from the clock means when in the active mode and is thereafter switched to the sleep mode.

3. The solar lighting apparatus of the sun tracking type according to claim 2 wherein the main power source unit is electrically connected to the control means and the drive means by way of a main power source switch, and the CPU turns on the main power source switch to drive the drive means and move the light reflecting means upon finding that the present time is in a time zone for tracking the sun when in the active mode and is thereafter switched from the active mode to the sleep mode in operating state, or is switched from the active mode to the sleep mode in operating state without driving the drive means when finding that the present time is not in the time zone for tracking the sun.

4. The solar lighting apparatus of the sun tracking type according to claim 1 wherein a charging switch is provided between the main power source unit and the backup secondary cell, and the CPU checks the secondary cell for the amount of charge therein in the active mode, turns on the charging switch when detecting a value lower than a predetermined amount of charge and is thereafter switched to the sleep mode.

5. The solar lighting apparatus of the sun tracking type according to claim 1 or 2 or 3 or 4 wherein the real time clock means includes a memory for storing data as to the latitude and longitude of the location of installation of the solar lighting apparatus, and the backup secondary cell backs up the clock means only.

* * * * *